3,057,917
PROCESS FOR PREPARING ORGANOPHOSPHORUS HALIDES
Ludwig Maier, Zurich, Switzerland
No Drawing. Filed June 29, 1959, Ser. No. 823,344
Claims priority, application Switzerland July 7, 1958
9 Claims. (Cl. 260—543)

The present invention is concerned with a new process for the preparation of organic phosphorus halides by the direct treatment at elevated temperatures of elementary phosphorus, preferably red phosphorus, with an organic halide, and continuously removing the reaction products from the reaction zone.

The invention is based on my discovery that hydrocarbon-substituted phosphorus halides can be produced by effecting reaction between elementary phosphorus and a hydrocarbon halide, preferably in gaseous or vapor state, while the reaction products are continuously being removed from the reaction zone. The present invention provides an improved continuous for producing hydrocarbon-substituted phosphorus halides in commercially useful quantities more cheaply than has been formerly possible.

It was known prior to my invention that various hydrocarbon-substiuted phosphorus halides could be produced. The known methods of preparing such substituted phosphorus halides generally have involved the use of some other organometallic compound and phosphorus chloride. A trialkylphosphine has been prepared by heating yellow phosphorus in the presence of zinc with alkyl iodides in liquid state in a sealed tube. This reaction only led to tertiary phosphines or their quaternary phosphonium salts respectively, because the reaction products were not continuously drawn off from the reaction mixture. (See: Krause and von Grosse, "Die Chemie der metallorganischen Verbindungen, Julius Springer, Berlin 1937.")

It was also known prior to my invention that hydrocarbon halides in the vapor state could be caused to react with elements other than phosphorus, but no element of the group Vb of the Periodic System has been investigated for this purpose.

The new process which comprises effecting reaction at an elevated temperature between a hydrocarbon halide, preferably a bromide, chloride or iodide, and phosphorus, preferably red phosphorus highly subdivided and maintained in the form of a static, mobile or agitated contact mass, and removing the reaction products continuously from the reaction zone, may be carried out in the presence or absence of a metallic catalyst for the reaction. In the process organophosphorus halides of the formula $R_nPX_{3-n}$, wherein R is an organic radical, preferably a hydrocarbon radical, X is a halogen, preferably chlorine, bromine or iodine, and $n$ is 1 or 2, are obtained. By a suitable selection of the organic halide it is possible to prepare in this way the desired organophosphorus halide compound. Some of these organophosphorus compounds are known compounds prepared by other methods; whereas, others of the compounds are new and hitherto not described in the literature.

It is an object of the invention to react phosphorus with a hydrocarbon halide while the latter is gaseous or vapor state and while the phosphorus is intimately mixed with a metallic catalyst (e.g. copper) and to remove the reaction products continuously from the reaction zone.

These and other objects of the invention will become apparent as the detailed description of the invention proceeds.

In a preferred embodiment of the invention, reaction is effected between the phosphorus and a hydrocarbon halide, passing the said hydrocarbon halide in gaseous or vapor form over and through a suitable contact mass comprising a uniform mixture of phosphorus and a metallic catalyst for the reaction, prepared by thoroughly mixing the comminuted components in suitable proportions, heating the said phosphorus containing contact mixture at a temperature sufficiently high to cause reaction between the hydrocarbon halide and the phosphorus component, and collecting the hydrocarbon phosphorus halides.

Contact masses suitable for reacting' hydrocarbon halides in vapor or gaseous state with phosphorus are obtained by mixing powdered phosphorus and an intimately associated metallic catalyst with an inert carrier material (e.g., glass wool, asbestos wool, pumice, etc.) and heating the mixture at an elevated temperature, preferably in the range of 200° C. to the sublimation point of phosphorus, under reducing conditions (e.g., in a hydrogen atmosphere) for a period sufficiently long to increase the catalytic activity of the metallic catalyst. An intimate association of phosphorus and the metallic catalyst can be obtained, for example, by grinding their mixture. The proportions of components constituting the contact masses can be varied considerably. Preferably, however, the solid mixture of the reactive components consists substantialy of a preponderant proportion of phosphorus and a minor proportion of copper or other metallic catalyst for the reaction between phosphorus and a hydrocarbon halide. The intermixture of inert carrier materials facilitates the flow of gaseous hydrocarbon halide through the contact mixture. Particularly good results have been obtained with a solid contact mass, which is produced by heating at a temperature range of 300 to 400° C. under reducing conditions a uniform mixture of, by weight, from 5 to 30 percent comminuted copper and from 95 to 70 percent comminuted phosphorus intermingled with, for example, glass wool.

The reaction between hydrocarbon halides and phosphorus is preferably conducted at atmospheric pressure, but superatmospheric or subatmospheric pressures can be advantageous in other cases.

A specific method feature of my invention is the new and improved method of preparing, for example, methyl phosphorus chlorides or bromides, which comprises causing a gaseous methyl chloride or bromide to react with the phosphorus component of a contact mass obtained by heating in a hydrogen atmosphere a mixture of intimately associated powdered phosphorus and powdered copper or other metallic catalyst for the reaction between methyl chloride or bromide and phosphorus, said reaction being carried out within the temperature range of 200 to 440° C., preferably of 320 to 380° C. removing the reaction products continuously from the reaction zone and recollecting the methyl phosphorus chlorides or bromides by condensing the effluent gaseous reaction products.

The organic halides which are used for the conversion according to the invention, can be of any nature. Good results are obtained with alpihatic and aromatic halides which can be substituted. An illustrative listing not meant to be limiting of alkyl halides usable in the process of the invention is as follows: methyl iodide, ethyl chloride, n-propyl bromide, isopropyl bromide, n-butyl chloride, isobutyl iodide, t-butyl bromide, n-amyl chloride, n-hexyl iodide, ethylhexyl bromide, decyl iodide, dodecyl bromide, tridecyl iodide, hexadecyl chloride, heptadecyl bromide, octadecyl iodide, eicosyl chloride, dodocosyl bromide, heptacontyl bromide, etc. It should be noted that among the longer chain alkyl halides no designation has been made as to whether they are branched or straight chain. Both the branched and straight chain compounds are operable in the process. All the straight chain higher alkyl halides named are known, and branched chain compounds can be or have been made by the well-known "Oxo" process or other suitable processes. For some purposes preferred alkyl halide reactants are the lower (not more than 6 carbon atoms) alkyl bromides, chlorides or iodides, and especially preferred are those having not more than 3 carbon atoms; however, for some purposes, e.g., where oil solubility is desired in the final products, it is desirable to use the higher alkyl halides having up to about 22 carbon atoms. For other uses it is desirable to use alkyl halides having more than 22 carbon atoms.

An illustrative listing not meant to be limiting of unsaturated aliphatic halides usable as reactants in the process of the invention follows. First will be listed the alkenyl halides, such as the following: vinyl bromide, allyl bromide, vinyl chloride, allyl iodide, isopropenyl bromide, 1-butenyl chloride, 2-butenyl iodide, isobutenyl bromide, butadienyl bromide, 1-pentenyl iodide, 1-hexenyl bromide, heptenyl iodide, octenyl chloride, 8-heptadecenyl bromide, 8,11-heptadecadienyl bromide, etc. The alkynyl halides are as follows: ethynyl bromide, propynyl chloride, butynyl iodide, 1-pentynyl bromide, 2-pentynyl iodide, 1-hexnyl bromide, 2-hexynyl iodide, 1-octadecynyl chloride, etc. Usually it will be preferred to use the lower aliphatic unsaturated halides especially those having not more than 3 carbon atoms, but for some purposes the higher aliphatic unsaturated halides will be preferred.

The cycloaliphatic halides are also usable as reactants in the process of the invention. An illustrative listing not meant to be limiting of these compounds is as follows: cyclopropyl bromide, cyclopropyl iodide, cyclobutyl bromide, cyclobutyl chloride, cyclopentyl bromide, cyclopentenyl bromide, cyclohexyl bromide, cyclohexyl chloride, cyclohexyl iodide, 1 - cyclohexenyl bromide, 2-cyclohexenyl iodide, cycloheptyl bromide, etc.

An illustrative (non-limiting) listing of the aryl halides of the invention is as follows: chlorobenzene, bromobenzene, iodobenzene, o-bromotoluene, p-bromotoluene, m-bromotoluene, p-chlorotoluene, m-iodotoluene, 3-bromo - o - xylene, 4 - bromo - o - xylene, 5 - bromo - o-xylene, 2 - bromo - m - xylene, 4 - bromo - m - xylene, 5 - bromo - m - xylene, 2 - bromo - p - xylene, 3 - chloro - o - xylene, 2 - iodo - m - xylene, 2 - bromo - ethylbenzene, α - bromonaphthalene, β - bromonaphthalene, α - chloronaphthalene, β - iodonaphthalene, 2 - bromo-α - methylnaphthalene, 1 - bromo - β - methylnaphthalene, 1-bromoanthracene, etc. Preferred reactants for many purposes are the monocyclic aryl halides, especially phenyl, the tolyl and the xylyl halides; however, bicyclic aryl halides such as the naphthyl halides and methyl or dimethyl naphthyl halides are also especially important; i.e., the aryl halides having not more than about 12 carbon atoms. In certain instances, however, other aryl halides including anthracyl halides are also important.

An illustrative (non-limiting) listing of products of the method of the invention follows: First will be given alkyl compounds, such as: methyldibromophosphine, dimethylbromophosphine, methyldichlorophosphine, ethyldibromophosphine, diethylbromophosphine, ethyldiiodophosphine, n - propyldibromophosphine, di - n - propylbromophosphine, n - propyldiiodophosphine, isopropyldibromophosphine, diisopropylbromophosphine, isopropyldichlorophosphine, n - butyldibromophosphine, di - n - butylbromophosphine, n-butylchlorophosphine, t-butyldibromophosphine, di - t - butylbromophosphine, di - t - butyliodophosphine, n - amyldibromophosphine, di - n - hexylbromophosphine, octyldibromophosphine, didodecylochlorophosphine, tridecyldiiodophosphine, heptadecyldibromophosphine, octadecyldibromophosphine, dioctadecylchlorophosphine, eicosylidiiodophosphine, etc. A few of the aliphatically unsaturated products are illustrated as follows: vinyldibromophosphine, divinylbromophosphine, vinyldiiodophosphine, allyldibromophosphine, diallylbromophosphine, allyldichlorophosphine, 8-heptadecenyldibromophosphine, bis(8 - heptadecenyl)bromophosphine, 8,11-heptadecadienyldibromophosphine, bis-(8,11 - heptadecadienyl)bromophosphine, 8,11 - heptadecadienyldichlorophosphine, 8 - heptadecenyldiiodophosphine, ethynyldibromophosphine, diethynylbromophosphine, etc. Cycloaliphatic products are illustrated as follows: cyclopropyldibromophosphine, dicyclohexylchlorophosphine, dicyclopentylbromophosphine, dicyclopentyliodophosphine, cyclohexyldibromophosphine, dicyclohexylbromophosphine, cycloheptyldibromophosphine, dicycloheptyliodophosphine.

An illustrative listing (non-limiting) of the aryl phosphorus halides of the invention is as follows: phenyldibromophosphine, diphenylbromophosphine, phenyldichlorophosphine, o - tolyldibromophosphine, m - tolyldibromophosphine, p - tolyldibromophosphine, bis(o-tolyl)bromophosphine, bis(m - tolyl)bromophosphine bis(p - tolyl)bromophosphine, p - tolyldiiodophosphine bis(m - tolyl)chlorophosphine, 3 - (o - xylyl)dibromophosphine, 4 - (o - xylyl)dibromophosphine, 5 - (o-xylyl)dibromophosphine, 2 - (m - xylyl)dibromophosphine, 4 - (m - xylyl)dibromophosphine, 5 - (m - xylyl)-dibromophosphine, 2 - (p - xylyl)dibromophosphine, bis[3 - (o - xylyl)]bromophosphine, bis[4 - (o - xylyl)]-bromophosphine, bis[5 - (o - xylyl)]bromophosphine, bis[2 - (m - xylyl)]bromophosphine, bis[4 - (m - xylyl)]bromophosphine, bis[5 - (m - xylyl)]bromophosphine, bis[2 - (p - xylyl)]bromophosphine, 3 -(o - xylyl)dichlorophosphine, bis[2 - (m - xylyl)]iodophosphine, α - naphthyldibromophosphine, β - naphthyldibromophosphine, etc.

The invention is further explained in the examples below. The parts mentioned are parts by weight unless stated otherwise.

*Example 1*

A Pyrex reaction tube (70 cm. long, 2.5 cm.) heating zone 60 cm. long was charged with 100 g. of powdered red phosphorus, intermingled with glass wool and pretreated by heating at a temperature of 300° C. in a hydrogen atmosphere for 1 hour.

In other examples, red phosphorus and a metallic catalyst were intimately associated before intermixing with glass wool and pre-treated as described.

Then, a stream of gaseous methyl chloride was passed into the heated tube for a period of 10 hours, the reaction temperature being increased in rates of 20° C. every two hours from 300° C. at the beginning of the run up to 380° C. at the end of the run.

The effluent gaseous reaction products passing from the exit end of the reaction tube were collected at room temperature. The lower boiling methyl chloride was separately condensed in a trap at −78° C.

| Run | Catalyst | Crude Reaction Products, Yield/10 hours, grams |
| --- | --- | --- |
| A | | 47 |
| B | Cu (20 g.)+Zn (5 g.) | 39 |
| C | Cu (20 g.) | 120 |
| D | Cu (20 g.)+Ag (5 g.) | 120 |
| E | Zn (20 g.) | 3 |
| F | Ag (10 g.) | 01.5 |
| G | Zn (10 g.)+Ag (5 g.) | 5 |

The fractional distillation of the crude reaction products from Run C and D gave the following three fractions:

Run C:
 (a) 40–75° C., 8 g., methylphosphine+$(CH_3)_2PCl$
 (b) 75–78° C., 59 g., $CH_3PCl_2$ Run D:
 (a) 20–75° C., 6.5 g., methylphosphine+$(CH_3)_2PCl$
 (b) 75–78° C., 38 g., $CH_3PCl_2$ The residue contained much yellow phosphorus.

Example 2

Using the apparatus and procedure analogous to that of Example 1, the yields of methyl phosphorus chlorides at different reaction temperatures were determined in other series of experiments employing the copper catalyst mass of Example 1C and a reaction time of 2 hours.

| Run | Temperature, °C | Crude Reaction Products, Yield/2 hours, grams |
|---|---|---|
| A | 330 | 2 |
| B | 320 | 7 |
| C | 340 | 36 |
| D | 360 | 44 |
| E | 380 | 31 |

It appears from the above data that for reacting methyl chloride with phosphorus the most preferable reaction temperature is between 340 and 380° C.

Example 3

A Pyrex tube was charged with 80 g. of red phosphorus powder intermingled with asbestos wool and the mixture was pretreated by heating to 350° C. in a hydrogen atmosphere for 1 hour.

A stream of gaseous methyl bromide was passed into the heated tube while a reaction temperature of 320° C. was maintained in the tube. The reaction products passing from the exit end of the reaction tube were collected at room temperature and the unreacted methyl bromide was separately condensed in a trap at −78° C.

Over a period of 16 hours 85 g. (=5.3 g./hr.) of crude reaction products, being partly liquid and partly solid, were collected. Two distillations at atmospheric pressure gave 69 g. of liquid products and by fractional distillation three fractions were obtained:

(a) 124–138° C., 2 g. $(CH_3)_2PBr$
(b) 138–143° C., 56 g. $CH_3PBr_2$
(c) 143–170° C., 11 g. $PBr_3$

Example 4

A uniform mixture containing 100 g. of red phosphorus powder and 20 g. of copper powder on asbestos wool was pre-treated and brought into contact with the vapors of methyl bromide as described in Example 3. The comminuted copper was of approximately 400 mesh particle size. Reaction temperature 350° C.

Over a period of 24 hours 205 g. (=8.5 g./hr.) of crude reaction products were collected. Two distillations at atmospheric pressure gave 152 g. of liquid products and by fractional distillation three fractions were obtained:

(a) 124–138° g. C., 2 g. $(CH_3)_2PBr$
(b) 138–143° C., 148 g. $CH_3PBr_2$
(c) 143–170° C., 2 g. $PBr_3$

Example 5

Using the procedure analogous to that of Example 4 the yields of methyl phosphorus bromides at different reaction temperatures were determined in other series of experiments. The reaction time was 24 hours.

| Run | Temperature, °C | Crude Reaction Products, yields/24 hours, grams | Once distilled, grams |
|---|---|---|---|
| A | 230 | 36 | 24 |
| B | 250 | 53 | 36 |
| C | 280 | 96 | 62 |
| D | 320 | 152 | 113 |
| E | 350 | 205 | 151 |
| F | 370 | 135 | 70 |

It appears from the above data that for reacting methyl bromide with phosphorus the most preferable reaction temperature is between 320 and 360° C.

Example 6

A uniform mixture containing 100 g. of pulverized phosphorus and 20 g. of copper on glass wool was pretreated as described in Example 3 and brought into contact with the vapors of methyl iodide.

340 g. of methyl iodide were passed through the contact mass at a temperature of 300° C. over a period of 17 hours and 95 g. of crude reaction products were collected.

The fractional distillation yielded 31 g. of $CH_3PI_2$; B.P. 73–75° C./5 mm. Besides, $PI_3$ was also isolated from the reaction products.

Example 7

Ethyl chloride was passed over an analogous phosphorus containing contact mixture as obtained in Example 6. The processing was effected as described in the foregoing examples, except that the temperature of operation was about 350 to 440° C.

Over a period of 23 hours 29 g. (=1.46 g./hr.) of crude reaction products were collected. The fractional distillation yielded $C_2H_5PCl_2$; B.P. 113–115° C. Minor quantities of $PCl_3$ and $(C_2H_5)_2PCl$ were also isolated.

Example 8

Ethyl bromide was passed at a rate of 11 g. per hour through an intimate mixture consisting of 50 g. powdered red phosphorus and of 10 g. powdered copper, pre-treated by heating to 350° C. in a hydrogen atmosphere for 2 hours.

The condensed reaction products were subjected to a fractional distillation and three fractions were obtained:

(a) 61–158° C., 2 g. crude $(C_2H_5)_2PBr$
(b) 158–165° C., 41 g. $C_2H_5PBr_2$
(c) 165° C.–170° C., 1 g. $PBr_3$

Example 9

Copper-catalyzed treatment of red phosphorus with $CH_2=CHBr$, with the formation of $CH_2=CHPBr_2$ and $(CH_2=CH)_2PBr$.

A mixture of 50 parts of red phosphorus and 10 parts of copper powder is heated in a stream of nitrogen for 2 hours at 350° C. Then the temperature is raised to 450° C. and $CH_2=CHBr$ is led through at a velocity of 11 g./per hour.

The reaction product is fractionally distilled, preferably under vacuum or nitrogen gas blanketing, and a substantially pure fraction of $CH_2=CHPBr_2$ is recovered as the main product, B.P. 163–165° C.

In making the vinyldibromophosphine of this example a temperature of about 420° C. to about 440° C. gives high yields. In general in making alkenyl phosphorus halogenides temperatures in the range of about 350° C. to about 440° C. are satisfactory.

Example 10

Silver-catalyzed treatment of red phosphorus with phenyl bromide, with the formation of phenyldibromophosphine $(C_6H_5PBr_2)$.

A mixture of 50 parts of red phosphorus and 10 parts of silver powder is heated in a stream of nitrogen for 2 hours at 350° C. Then the temperature is raised to 430° C. and phenyl bromide $(C_6H_5Br)$ is led through at a velocity of 11 g./per hour.

The reaction product is fractionally distilled, and a substantially pure fraction of phenyldibromophosphine $(C_6H_5PBr_2)$ is recovered as the main product.

In making the phenyldibromophosphine of this example a temperature of about 400° to about 430° C. gives high yields. In general in making aryl phosphorus halogenide temperatures in the range of about 370° to about 440° C. are satisfactory.

Several modifications will become immediately apparent to one skilled in the art. It will be understood, of course, that my invention is not limited to the specific hydrocarbon halides named in the above illustrative examples and that any other halide corresponding to the given definition may be employed as reactant with phosphorus, the conditions of reaction generally being varied depending upon the particular starting hydrocarbon halide and the particular end-products desired to be obtained.

Instead of red phosphorus, any other form of phosphorus (e.g. yellow, violet or black phosphorus) can be used. It was found that during the reaction yellow phosphorus will be transformed into red phosphorus and vice versa.

Although not limited thereto, the vapor phase reactions are preferred because they can be carried out more economically and may be directed to the desired monosubstituted phosphorus halides, e.g., methyl phosphorus dichloride, dibromide etc., propyl phosphorus dichloride, dibromide etc.

It will be understood that the reaction is not limited to the fixed bed operation. It may be particularly advantageous to effect the production of hydrocarbon-substituted phosphorus halides in systems in which the highly subdivided phosphorus and catalyst materials are in a fluidized condition in their respective reactant vapors or gases. In fixed bed processing as in gas-solid dispersion type operations, the reaction products being continuously drawn off are mono- and di-substituted phosphorus halides rather than tri-substituted phosphines or their quaternary phosphonium salts respectively.

Likewise the invention is not limited to the specific temperature or catalyst (if any) used in the above examples in general, at higher temperatures the rate of reaction and also the pyrolysis increases, so that the resulting hydrocarbon phosphorus halides become poorer in organic radicals and correspondingly richer in halogen. For example, the temperature within the range of 320 to 380° C. has been found to be the most satisfactory in reacting gaseous methyl chloride or bromide with phosphorus in the presence of a copper catalyst to yield methyl phosphorus di-chloride or dibromide. These facts are illustrated in Examples 2 and 5.

Metallic catalysts other than copper can be employed to accelerate or to control the course of the reaction between the hydrocarbon halide and the phosphorus. Examples of such catalysts, in addition to copper, are nickel, silver, tin, antimony and their alloys with copper. It should also be realized that salts of these metals which yield the metals under reaction conditions will be the equivalent of the metals themselves as catalysts provided the anion of the salt does not in any way interfere with the reaction of the invention. The efficiency of a pretreated copper containing catalytic contact mass used in practicing the present invention will be noted by comparing the yields of methyl phosphorus dibromide in the condensates of Examples 3 and 4. The contact masses may also be pressed into pellets or granules of suitable size and shape, depending on the design of the reactor in which they are to be used.

Furthermore, instead of condensing all of the gaseous products, only the higher boiling end-products required may be condensed at a temperature between 0 to 25° C. and the gaseous hydrocarbon halide can be recycled continuously.

It can be advantageous to bring the hydrocarbon halide in vapor form into contact with the heated phosphorus in the presence of, i.e. mixed with, hydrogen or an inert gas such as nitrogen, methane etc. These gases function not only as a means for controlling the hydrocarbon phosphorus halide reaction but also as a carrier for the hydrocarbon halide vapor. Thus, hydrogen or other gas may be passed over, or bubbled through a reservoir containing liquid hydrocarbon halide held at any desired temperature.

Many of the products of the method of the invention are old compounds known to be useful for a wide variety of uses, including biological toxicants, e.g., insecticides, lubricating oil additives, plasticizers, etc. In addition these products are valuable as intermediates for making other compounds, e.g., triorganophosphines, etc. Also reaction mixtures of the process of the invention can be reacted with organic magnesium bromides and methyl iodide, and triorganophosphine products recovered.

Although the invention has been described in terms of specified embodiments which are set forth in considerable detail, it should be understood that the invention is not necessarily limited thereto, since alternative embodiments and operating techniques will become apparent to those skilled in the art in view of the disclosure. That is, the term hydrocarbon has been used in its broader sense, in that reactants as described above may also contain constituents other than carbon and hydrogen which are non-reactive or at least which do not interfere with the desired organophosphorus halide-forming reaction at the conditions used; e.g., heterocyclic halides containing non-interfering substituents, alkoxyalkyl halides, etc. One skilled in the art will recognize that a compound containing a non-interfering group is the equivalent of the corresponding hydrocarbon containing only carbon and hydrogen. Hydrocarbons substituted with more than one halogen can even be used, but the reaction product may contain some hydrocarbon radicals attached to more than one phosphorus atom. Accordingly, modifications are contemplated which can be made without departing from the spirit of the desired invention.

What is claimed is:

1. A process for the preparation of organophosphorus halides of the formula $R_nPX_{3-n}$, wherein R is selected from the class consisting of alkyl radicals, alkenyl radicals and phenyl radicals, X represents a halogen atom selected from the class consisting of chlorine, bromine and iodine and $n$ is an integer of from 1 to 2 comprising treating phosphorus at an elevated temperature sufficient to cause the phosphorus to react with a vaporized hydrocarbon halide of the formula RX where R and X are as defined hereinabove and continuously separating the reaction products from the reaction zone.

2. A process according to claim 1, wherein R is a hydrocarbon radical containing not more than three carbon atoms in the alkyl radical.

3. A process according to claim 1, wherein the reaction is carried out at a temperature within the range of 200° C. to the sublimation point of phosphorus.

4. A process according to claim 1, wherein the reaction is carried out in the presence of a metallic catalyst selected from the class consisting of copper, nickel, silver, tin, antimony and alloys of copper with at least one other member of the said class of metals.

5. A process according to claim 4, wherein the metallic catalyst is copper.

6. A process for the preparation of organophosphorus halides which comprises effecting reaction at a temperature within the range of 200° C. to the sublimation point of phosphorus between a gaseous hydrocarbon halide selected from the group consisting of alkyl chlorides, bromides and iodides containing not more than three carbon atoms in the alkyl radicals and the phosphorus component of a contact mixture consisting of phosphorus and an intimately associated metallic catalyst selected from the class consisting of copper, nickel, silver, tin, antimony and alloys of copper with at least one other member of the said class of metals, and continuously removing the reaction products from the reaction zone.

7. A process according to claim 6, wherein the said contact mixture consists substantially of a preponderant proportion of phosphorus and a minor proportion of the metallic catalyst for the said reaction.

8. A process according to claim 7, wherein the said contact mixture has been pre-treated by heating in a hydrogen atmosphere at a temperature within the range of 200° C. to the sublimation point of phosphorus.

9. A process for preparing methylphosphorus halides, which comprises effecting reaction at temperatures of 320° to 380° C. between a gaseous hydrocarbon halide, selected from the class consisting of methyl chloride and methyl bromide and the phosphorus component of a contact mass, obtained by heating at a temperature within the range of 300° C. to the sublimation point of phosphorus a uniform mixture of powdered copper and of powdered phosphorus in a hydrogen atmosphere for at least one hour, and continuously removing the reaction products from the reaction zone.

References Cited in the file of this patent

Goddard: Textbook of Inorganic Chemistry, vol. XI, part III, page 21 (1936), Chas. Griffin and Co., Ltd. (London).

UNITED STATES PATENT OFFICE
CERTIFICATE OF CORRECTION

Patent No. 3,057,917　　　　　　　　　　　　　October 9, 1962

Ludwig Maier

It is hereby certified that error appears in the above numbered patent requiring correction and that the said Letters Patent should read as corrected below.

Column 1, line 21, after "continuous" insert -- process --; column 5, "Example 2", in the table, second column, line 1 thereof, for "330" read -- 300 --; same column, "Example 5", in the table, third column, line 6 thereof, for "135" read -- 125 --.

Signed and sealed this 2nd day of April 1963.

(SEAL)
Attest:

ESTON G. JOHNSON
Attesting Officer

DAVID L. LADD
Commissioner of Patents